Figure 1A:
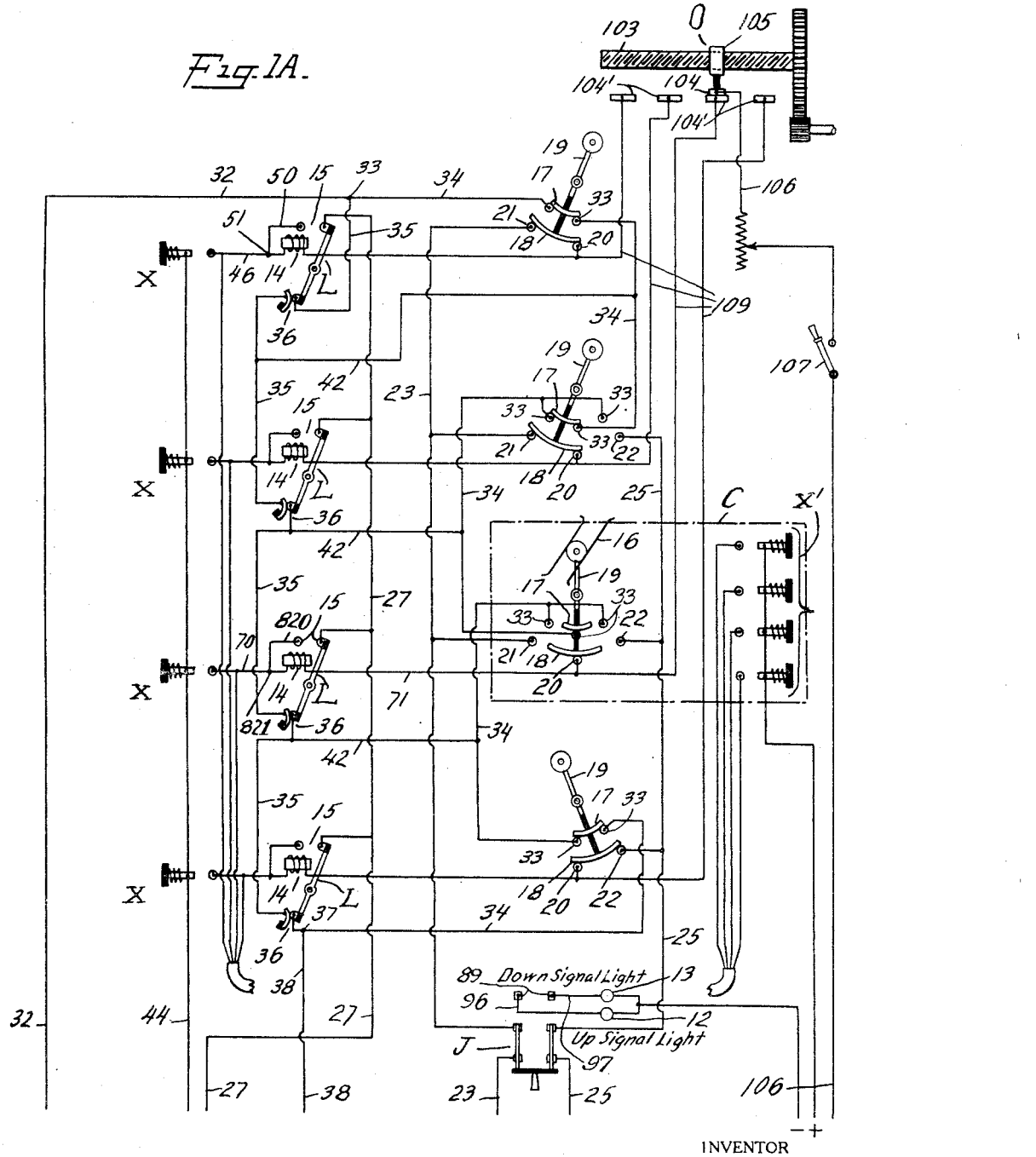

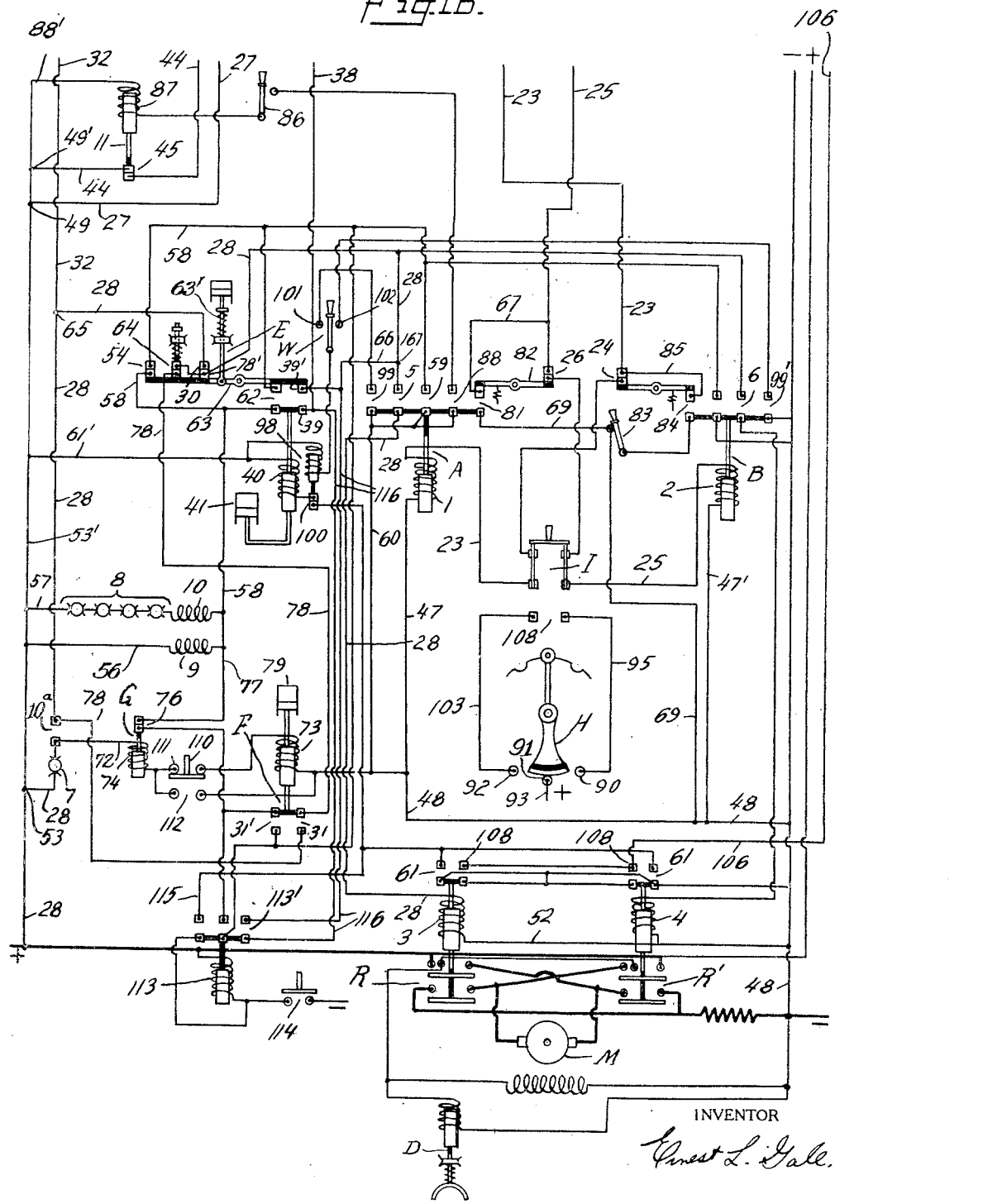

Patented Apr. 10, 1934

1,954,354

UNITED STATES PATENT OFFICE 1,954,354

PUSH BUTTON CONTROL SYSTEM FOR ELEVATORS

Ernest L. Gale, Yonkers, N. Y., assignor, by mesne assignments, to Honesdale National Bank, Honesdale, Pa.

Application May 11, 1928, Serial No. 276,937

71 Claims. (Cl. 187—29)

My invention relates to a push-button control system for elevators.

The invention has for its objects the various provisions summarized as follows:—

First, a push-button control system comprising for each of a plurality of landings, one control means or push button at each landing and one in the car, having combined dispatch and intercepting functions, and effective to cause stops of the car at the landings successively in their natural order regardless of the order in which said control means are actuated, the car for either direction of movement responding to a farthest actuated button before reversal is normally effective.

Second, an intercepting control system comprising floor-relay switches and floor-selector switch mechanism of standard type as commonly employed in well known push-button control systems of the non-intercepting or individually controlled type, combined with a novel system of circuits arranged so that any button is actuable at any time excepting if actuated when the car is within the stopping zone of its landing. Actuation of any button is registered by closure of its associated floor-relay switch regardless as to whether the car is moving toward or away from its landing, and regardless of the direction of car movement.

Third, time-limit switch mechanism to provide a stopping period which allows for reasonable delay of car and hall passengers to leave or occupy the car, and which at the expiration of said period operates automatically to restart the car provided the car gate and hoistway door are in closed position but regardless as to whether they are opened during the stopping period, and which on the other hand is effective if the car gate and hoistway door are opened during car stop, automatically to re-start the car instantly by closure of the car gate and hoistway door.

Fourth, means to render the system effective so that the car can be dispatched by the hall-buttons even though the car gate is left in open position by the last passenger to leave the car.

Fifth, an intercepting control system arranged for dual operation whereby the car and hall push-buttons of themselves function to both dispatch and intercept the car in a manner hereinbefore mentioned, and for car switch operation, the car switch is effective to start, stop and reverse the car at will at any point intermediate the limits of car movement, and at the same time the car and hall-buttons are effective to intercept the car but are ineffective to dispatch it or in other words control its starts, and are effective also to control "up" and "down" car operator signals to give indication as to when the car has reached the farthest-up and farthest-down points for which buttons are actuated.

Sixth, means whereby the car operator may at will, render the system non-responsive to the hall and car push-buttons so that the car is under control of the car switch exclusively, said buttons at the same time however remaining operable so that actuation thereof is registered by closure of their associated floor-relay switches and the buttons remain effective to give indication above refered to.

Seventh, means operable when the push-button system above is effective, to render the car for one direction of movement responsive to actuated buttons to be intercepted thereby, and for the other direction of car movement, any hall button which dispatches the car does so to the exclusion of all the remaining hall buttons. In either case the car is responsive to all actuated car buttons.

The accompanying drawings (Figures 1$^A$ and 1$^B$ to be read together) illustrate in a more or less diagrammatic manner, a dual system of control for intercepting the car, constructed and arranged in accordance with the present invention.

An elevator car C is adapted for operation by a usual type of hoisting motor M provided with a usual type of electro-mechanical brake apparatus D. Up and down direction relay switches A and B respectively are provided with operating windings 1 and 2 respectively, responsive to the hall push buttons X one for each landing, and to the car push buttons X', one for each landing R and R' are electro-magnetically operable reversing switches having operating windings 3 and 4 with circuits controllable by direction switch contactors 5 and 6 respectively to initiate movement of the car upwardly and downwardly respectively in response to actuated hall and car push-buttons.

Time-limit switch mechanism to control duration of car stops consists of a device such as E effective automatically to re-start the car after each stop, regardless of whether the hoistway door and car gate had been opened during car stop, and additional devices F and G together are effective by closure of the car gate and hoistway door immediately to re-start the car independently of the device E. Other elements consist of car gate contactors 7, hoistway door contactors 8, door-lock cam releasing magnet 9, a gate latch release magnet 10, and a non-interference relay 11. The following elements are all to be located in the elevator car but are illustrated elsewhere for convenience and clarification of circuits; viz; a manually operable car switch H, a double pole, double throw change-over knife switch I, which when in position as shown conditions the system to be controllable by the push-buttons alone to the exclusion of the car switch, and when thrown to another position, conditions the system to be controllable by the car switch, and at the same time, the starting or dispatch function of the car and hall-buttons is rendered inoperable, but said buttons through the intermediary of an additional double-pole, double-throw knife switch J are rendered effective to intercept the car and at the same time control "up" and "down" car operator signals in the form of lights 12 and 13 respectively to give indication as to when the car has reached the farthest-up and farthest-down points for which push-buttons are actuated.

Floor-relay switches L are of a well known type each comprising an operating winding 14 energizable in response to momentary actuation of its corresponding car and hall-buttons in parallel and having self-holding contactors 15 in the circuit of its winding whereby the latter maintains its switch in actuated position electrically independently of its associated button, until response of the car thereto. The contactors 15 of all the floor-relay switches are connected in parallel by a self-holding feed wire 27.

Floor-selector switch mechanism is of a well known and standard type and may be located remotely from the car and driven directly thereby as by means of a cable and drum, tape and reel, or sprocket and chain connections (not shown), or may be of a type as illustrated herein, located in the hoistway adjacent each landing to be actuated directly by a cam 16 on the car. A selector switch mechanism for each of the landings comprises two segmental contactors 17 and 18 carried by a pivotally supported switch arm 19. The segmental contactors 18 for one position thereof, as for example when set my movement of the car downwardly, engage fixed contactors 20 and 21 in the circuit of the "up" direction switch winding, and for another position thereof, as for example when set by movement of the car upwardly, engage contactors 20 and 22, in the circuit of the "down" direction switch winding. All contactors 21 are connected in parallel by a common wire 23 which feeds the "up" direction switch winding 1 by way of contactors 24 controllable by the "down" direction switch. All contactors 22 are connected in parallel by a common wire 25 which feeds the "down" direction switch winding 2 by way of contactors 26 controllable by the "up" direction switch.

Each start of the car away from a landing is effected by energizing a reversing switch winding by connecting it across the line by way of a circuit 28 which includes car gate contactors 7, contactors 10ª controllable by the gate latch release magnet 10, contactors 30 of the time-limit switch E or contactors 31 of time limit switch F depending on circumstances as will be described in detail hereinafter and contactors 5 or 6 of a direction switch in accordance with whichever one is closed. When the car has been caused to move away from the landing a short distance, the energizing circuit for the reversing switch winding is automatically transferred from the circuit just traced to a system of intercepting circuits by which medium the car can be intercepted at any landings toward which it is moving for which car and hall push-buttons are actuated. Said intercepting system of circuits consists of a wire 32 which forms a shunt around the time-limit switch contactors 30 said circuit branching at a junction 33 to form two paths 34 and 35, the path 34 including the contactors 33 and segment 17 (for either set position) of the floor-selector switches for all the landings, in series, and the path 35 including back-contactors 36 of all the floor-relay switches in series, the two paths forming another junction at 37 and continuing by way of a wire 38 which connects with a normally open contactor 39 actuable by a relay 40 having a timed movement by providing it with a dash-pot 41. The two series wires 34 and 35 are cross-connected by parallel wires 42, so that in effect the series wire 35 together with the cross-connecting wires 42 provide for each landing, a shunt circuit around its associated floor-selector switch contactors 33 and segment 17. With the present arrangement of intercepting circuits it will be seen that after initial movement of the car away from a landing has been effected, the series circuit 34 is completed by way of all the floor selector switches to provide a feed for the reversing switch winding independently of the series feed 35. The series wire 35 of itself cannot be relied upon as a feed for the reversing switch winding because it is subject to be opened at any time at any of the back-contactors 36 as effected by actuation of their associated push-buttons excepting of course when the car is within a stopping zone of a landing in which case the button corresponding to such landing is inoperative and this is so because with the car at a landing the energizing circuit for the floor-relay switch corresponding thereto is open-circuited at the floor-selector contactors 18, 20, 21 and 22.

Thus, for all landings for which buttons are actuated to open-circuit their shunts at the contactors 36, the car will be intercepted at each of such landings in their turn as the car by its movement actuates their associated floor-selector switch contactors 17 and 33 to open at that point the series feed 34 for the reversing switch winding.

On the other hand, for all landings for which buttons are not actuated, the shunts are closed at the contactors 36 so that as the series circuit 34 is opened by car movement at each of said landings, each of said shunts will as its corresponding series circuit is opened, complete a by-pass around said point of opening so that a completed circuit at such time for a reversing switch winding consists in part, of the floor-selector contactors 33 and 17 for all floor-selector switches excepting the one actuated, and by way of the closed shunt controlled by contactors 36 around said actuated floor-selector switch. The circuit for the reversing switch winding by being so maintained results in movement of the car uninterruptedly past landings for which car and hall push buttons are not actuated.

Coming now to the operation of the parts under push button control, let it be assumed that the car is at rest at the second landing with all the hoistway doors and the car gate closed and the car not under dispatch, for which condition the various elements will assume the position as illustrated. Let it be assumed now that the 4th landing hall push-button is momentarily actuated. By pressing said 4th landing button the floor-relay switch is for said landing caused to close its contactors 15 to complete a self-holding circuit for its winding 14, said circuit including the winding 1 of the "up" direction switch which latter will now close to effect movement of the car upwardly by closing a circuit at contactors 5 for an operating winding 3 for the "up" reversing switch R.

A circuit as completed by actuation of the 4th landing button may be traced as follows:—from a plus main, wire 28, wire 53', common feed wire 44 for the hall buttons, which wire includes contactors 45 of the non-interference relay 11, 4th landing hall button, wire 46, floor-relay winding 14, 4th landing floor-selector contactors 20, 18 and 21, common wire 23 to the operating winding 1 of the "up" direction switch, said wire 23 including the switch J, contactors 24, and knife switch I, thence through the winding 1 to wire 47, and thence to the minus main by wire 48.

A self-holding circuit may be traced as follows: branching from wire 53' at a junction 49, wire 27, contactors 15 of 4th landing floor-relay switch, wire 50 to a junction 51 with wire 46 and from thereon as above traced by the circuit including the operating winding 1 of the "up" direction switch.

An initial energizing circuit for the operating winding 3 of the "up" reversing switch may be traced as follows:—by way of the wire 28 which includes the car gate contactors 7, contactors 10ᵃ controllable by the gate latch release magnet 10, contactors 30 of time-limit switch E, contactors 5 of the "up" direction switch, through winding 3, and thence to the minus main by wire 52.

A circuit for the door-lock and switch cam releasing magnet 9, also the gate latch release magnet 10 may be traced as follows:—branching from wire 53' by way of parallel circuits 56 and 57, the circuit 57 including the hoistway door-contactors in series with the gate-latch release magnet 10 including contactors 54 of the switch E and also contactors 59 of the "up" direction switch and thence to the minus main by way of the wires 60 and 48.

The motor and brake winding circuits are old and well known and hence will not be traced in detail, it being sufficient to state merely that the "up" reversing switch by closing will effect release of the brake and direct current to the hoisting motor to move the car upwardly and said switch by opening will effect car stop.

With the "up" reversing switch in closed position, it closes auxiliary contactors 61 to close an energizing circuit 61' for the winding 40, the effect of which is to automatically transfer the energizing circuit of the reversing switch winding 3, from the initial energizing circuit 28, to the intercepting system of circuits. The winding 40 being energized will raise the contactor 39, but with delayed movement, to engage contactors 39' and 62 of the time-limit switch E. At this point the purpose of the said initial energizing circuit will be explained. It will be remembered, that the series intercepting wire 34 is open-circuited by the floor-selector contactors 33 and 17, with the car at a landing. Thus with the car stopped at the second landing, the series circuit 34 is opened at the second landing floor-selector contactors 33 and 17 and the second landing shunt may be opened as the car moves away from the landing and before said series circuit 34 is reclosed at said landing, so that the intercepting circuits cannot be relied upon to provide a feed for the reversing switch windings to start the car after each landing stop. Hence the initial energizing circuit for the reversing switch windings is provided which is independent of the intercepting circuits and apparatus.

The movement of the car upwardly an inch or so from the second landing results in closure of the second landing floor-selector contactors 33 and 17 so that the series circuit 34 is thus closed by way of all the floor-selector switches, and the timing of the contactor 39 is such as to insure closure of said contactors 33 and 17 before contactors 39 and 39' are engaged. The initial engagement of contactors 39 and 39' completes the intercepting circuit which as a whole shunts around the time-limit switch contactors 30, and additional movement of the contactor 39 after it engages the contactors 39' and 62, causes rocking movement of the switch arm 63 of the time-limit switch E to open circuit the three sets of contactors 30, 54 and 64 so that we now have the energizing circuit for the reversing switch winding 3 transferred from the initial energizing circuit 28 to the intercepting system of circuits and such transfer is made without interruption to the feed for the winding 3.

Contactors 62 by engaging, and the contactors 54 by being open-circuited, results in transferring the feed for the windings 9 and 10 from the initial energizing circuit 28 to the control of the intercepting system of circuits.

A circuit for the "up" reversing switch winding as now controlled by the intercepting system is as follows: the same as the initial energizing circuit 28 to a junction 65 therewith, wire 32, series wire 34 including the floor-selector contactors 17 and 33 (for either set position of the segment 17) of all the floor-selector switches, wire 38, contactors 39, 39' of the time-limit switch E, wire 66 and to a junction 167 with wire 28, and continuing from there on thru the reversing switch winding 3 by way of the "up" direction switch contactors 5.

We now have the car moving upwardly as the result of momentary actuation of the 4th landing hall button and during such movement it will be intercepted at any landing toward which it is moving whose shunt circuit is opened at the contactors 36 as by button operation, so that as the car open-circuits the floor-selector contactors 33 and 17 for each landing whose shunt is opened, it is thus intercepted in its movement by so opening the circuit of the reversing switch winding 3.

Assume now that during upward movement of the car and prior to it reaching the 3rd landing the hall push-button thereat is momentarily actuated. Actuation of said button will cause actuation of the 3rd landing floor-relay to close its top contactors and open its bottom contactors 36.

Said relay switch will by reason of its self-holding circuit for its winding, maintain itself in actuated position electrically until the car stops at its landing. Now, with the shunt circuit around the 3rd landing floor-selector contactors 33 and 17 opened at the contactors 36 corresponding to said landing, a feed by such path for the reversing switch winding is thus cut off so that the car by actuating the third landing floor-selector contactors 33 and 17 thus open-circuits the series feed wire 34 for the reversing switch winding and in such manner the reversing switch is caused to open to effect automatic car stop or interception of the car.

With the car stopped at the third landing the segmental contactors 17 and 18 each will assume a neutral position with respect to their co-operating fixed contactors 33, and 21 and 22 respectively, and for such position of the segmental contactors, the self-holding energizing circuit for the 3rd landing floor-relay is open-circuited to permit its switch to assume a normal position to close its back-contactors 36 thus to close the shunt-circuit around their associated floor-selector contactors 33 and 17 which are now open-circuited. The intercepting circuit is now completed by way of all the floor-selectors excepting that for the third landing, and shunts around the latter selector by way of the contactors 36 for said landing. However at this time the intercepting system of circuits which terminate at wire 38 are open-circuited at contactors 39 and 39' of the time-limit switch E the contactor 39 dropping when its winding 40 is de-energized by opening of the "up" reversing switch contactors 61 thus releasing the rocking arm which by a retarded influence of spring 63' due to the action of a dash-pot, will operate to again close the three sets of contactors 30, 54 and 64.

It may be found desirable to adjust the segment 17 of each floor-selector switch so that it will be caused to disengage its co-operating fixed contactor 33 somewhat prior to the disengagement of the contactors 21 or 22 by their segment 18, the effect being to introduce a relatively short time period, to enable the reversing switch to open to effect opening of the intercepting system of circuits at the contactors 39 and 39' before the floor-relay winding is de-energized to permit closure of its back-contactors 36 to thus complete the shunt around its opened floor-selector contactors 33 and 17.

The above arrangement will prevent possible continuation of current supply for the reversing switch winding which might otherwise happen if the contactors 36 should close before the contactors 39, 39' open to interrupt the intercepting circuit at said point. With such relative adjustment of said elements it will be observed that the segment 18 when set by movement of the car in starting away from the landing, will engage its co-operating contactor before the segment 17 engages its co-operating contactor, which in effect means the operation of a button just at that instant of time will open the shunt circuit so that in effect a feed for the reversing switch winding by way of the intercepting circuits is opened at the shunt contactors 36 and the contactors 33 and 17. However, as will be remembered, the initial feed for the reversing switch winding to effect start of the car from a landing is by way of the wire 28, which is independent of the intercepting circuits, and hence the get-a-way of the car from each landing stopped at cannot be interfered with by reason of the adjustment which gives rise to the condition mentioned. Considering such adjustment under another condition, it may happen that when the car is traveling under full speed operation past a landing, a hall button is actuated just at that instant of time, or to be specific, just as the segment 18 engages the contactor 22 but before segment 17 is caused to engage a contactor 33, which in effect opens the shunt contactors 36. At the instant of time referred to car movement is under the control of the intercepting system of circuits and under the condition mentioned said circuit is opened at the series contactors 33 and 17 of the landing referred to. Now to prevent possible stoppage of the car under such circumstances as by opening said shunt which prevention is of course desirable because the car is at such time moving away from the landing, one of the contactors 36 is somewhat elongated, or it may be constructed and arranged to have a short follow-up movement, so that opening of the shunt is sufficiently delayed to span the period intervening between the closure of the two sets of floor-selector contactors.

Continuing now with the operation, the time switch E by adjustment of its dash-pot introduces a time-period say of from five to seven seconds duration which will allow for reasonable delay of car or hall passengers to leave or occupy the car. The time-switch E will close its three sets of contactors 30, 54 and 64 at the expiration of the time-period stated, and will thus be effective regardless as to whether the car gate and hoistway door had been opened during the stopping period, but provided they are in closed position, automatically to re-start the car in the original direction in which it was travelling at the time of interception.

Such an arrangement prevents hold-up of the car for an excessive period if a car passenger delays too long in opening the car gate, and prevents stalling of the car at a landing if a hall passenger dispatches the car to a landing but does not use it. However, if the car gate and a hoistway door are opened during stop of the car at a landing, their closure will re-start the car immediately without having to wait for the closure of the time-limit switch E. To accomplish such result the timing-devices F and G are arranged so that their windings 73 and 74 are de-energized only when the car gate is opened, the circuit therefor being by way of wire 72. When said windings are de-energized, the switch F closes its contactors 31, 31', and the switch G opens its contactors 76. Contactors 31' and 76 in series control a circuit by way of wire 77 for the cam magnet 9 and gate latch release magnet 10, and the contactors 31, and 64 control an energizing circuit which forms a by-pass around contactors 30 of time-switch E to feed the reversing switch winding by way of a wire 78 connecting with the contactors 10ª controlled by the gate latch release device. Now as soon as the car gate is closed by hand the windings 73 and 74 in series are energized by way of wire 72 branching from wire 28 the latter winding to close contactors 76, and the former to open the contactors 31 and 31' which opening is delayed by a dash-pot 79. In such manner the cam magnet 9 is energized by way of the wire 77 including contactors 31' and 76 in series, as is also the gate-latch release magnet 10 provided all the hoistway doors are closed. The contactors 31 and 64 in series control an energizing circuit for the reversing switch winding 3 by way of the wire 78 which branches from the gate latch release contactors 10ª and after by-passing the contactors 30 of time-switch E, then forms a junction at 78' with the initial energizing circuit wire 28. Dash-pot 79 is adjusted relatively to the adjustment of the dash-pot 41 for contactor 39, so that its contactors 31 and 31' are opened say a second or so after contactors 39 and 39' are engaged and in this manner the initial energizing circuit for the "up" reversing switch winding 3 is transferred from switch F to the intercepting system of circuits, as is also the control of the windings 9 and 10. It will be observed that at the time the device F initiates its opening movement, the device E will have to some degree started to close its contactors 30, 64 and 54 and while it takes 6 or 7 seconds to close contactors 30 and 54, one of the contactors 64 will however be adjusted relatively to its co-operating contactor to be engaged thereby say in 2 seconds or so, the effect being to insure closure of said by-pass wire 78 at that point by the time the car gate is re-closed by hand.

Since the fourth landing floor-relay switch is closed, its contactors 15 provide a farthest-up feed for the winding 1 of the "up" direction switch so that in effect the "up" direction switch is maintained closed uninterruptedly regardless of intermediate stops until the car has completed its trip to the farthest-up landing for which a push-button is actuated.

In this manner direction of car movement is maintained and the time-limit switches E or F and G will re-start the car in accordance with whichever direction switch is closed, in an original direction from any landings intermediate the position of the car and the farthest landing for which a button is actuated, or in a reverse direction as when the car completes a trip to such farthest landing, such reversal being in response to any buttons actuated subsequently to the car moving away from the landings.

Continuing with the operation, the car will now move upwardly and since the feed for the reversing switch winding 3 is open at the 4th landing shunt contactors 36 and is completed by way of the floor-selector contactors 17 and 33 of all the floor-selectors in series, stop of the car automatically at the 4th landing will be effected by opening such series circuit at the 4th landing floor-selector contactors 17 and 33 as effected by actuation thereof by the car.

Any hall-buttons, actuated while the car is moving away, from their landings or any similar car buttons will by only the single actuation thereof register the calls by effecting operation of their associated floor-relay switches which will in effect condition the system so that when the car completes its trip to a farthest-up or farthest-down point for which a button is pressed, reversal of car movement is automatically effected and the car will be automatically stopped in its return movement in response to such actuated push-buttons.

All floor-selectors below car position connect their associated floor-relay windings in circuit with the down feed wire 25 for the "down" direction switch winding the circuit for which is normally traced by way of normally closed contactors 26 controlled by the "up" direction switch. Now as the "up" direction switch closes, it closes contactors 81 and by so doing rocks the pivoted switch arm 82 to open-circuit the contactors 26. The closed contactors 81 close a bypass around the "down" direction switch winding 2 and connect with the minus main, so that in effect, the circuit for any floor-relay winding for landings below car position is by way of contactors 81. Hence with the car moving upwardly, any of the hall-buttons for landings below car position will be effective to energize their floor-relay windings to set same and so register the calls without causing actuation of the "down" direction switch which latter of course must remain open with the car moving upwardly. For example, assume that the second landing pushbutton is actuated when the car is moving upwardly away from its landing. A circuit for the second landing floor-relay winding will be as hereinbefore traced to a common wire 44, second landing button, wire 70, relay winding 14, wire 71, contactor 20, segment 18, contactor 22 connecting with the common wire 25 which includes the switch J, wire 67, contactors 81 and wire 69 to the minus main. The self-holding circuit for the second landing relay is by way of the self-holding feed wire 27, contactors 15, wire 820 to junction 821 with wire 70 and from there on through the relay winding 14 in a manner as above traced. From the above description it will be seen that with the car moving upwardly the push-button controlled circuits and the self-holding circuits for floor-relays corresponding to landings below car position are exclusive of the "down" direction switch winding 4. Now when the "up" direction switch opens, the contactors 26 are caused to engage first and then the contactors 81 are disengaged, and in this manner the continuity of the circuit 25 is maintained so that the setting of any floor-relays below car position will remain undisturbed when the "up" direction switch opens and said circuit 25 is thus transferred to include the "down" direction switch winding. Hence with the second landing floor-relay switch closed at the time mentioned, it becomes effective when the "up" direction switch opens, as when the car reaches the fourth landing, to effect energization of the "down" direction switch winding 2, so that closure of the time-limit switch E or closure of the car gate and hoistway door, will initiate movement of the car downwardly.

During the movement of the car downwardly it will be intercepted at the landings whose buttons are actuated during the movement of the car upwardly but after it had left their landings, and also at any landings toward which the car is moving whose buttons are actuated prior to the car reaching same.

The car push-buttons are connected in parallel with their corresponding hall push-buttons to control the floor-relay switches to effect dispatch and interception of the car in the same manner as effected by the hall push-buttons.

A knife switch 83 in the circuit of the common feed wire 23 for the "up" direction switch winding, when in open position, prevents setting of the floor-relays in response to any buttons above car position which are actuated as the car is moving downwardly. Said switch when in closed position and in conjunction with contactors 84 controllable by the "down" direction switch closes a by-pass circuit 85 around the "up" direction switch winding 1, so that in effect when the car is moving downwardly any buttons above car position are effective to cause actuation of the floor-relays and the circuits for the windings of said relays are maintained exclusive of said "up" direction switch winding by the provision of said by-pass wire 85. Hence by opening said by-pass wire 85 as by opening the knife switch 83, the buttons above car position are thus rendered inoperative during movement of the car downwardly. The knife switch 83 so long as it remains in open position, conditions the system so that the car can be intercepted only on its downward trip and an additional manually operable knife switch 86 is to be in closed position at the same time to render the non-interference device 11 operable. Hence with said knife switch 86 closed a circuit for the winding 87 is closed at one point and when the "up" direction switch is closed, contactors 88 controlled thereby are closed to complete the energizing circuit for said winding, by way of wire 88' branching from wire 53' at the junction 49' the circuit 88' forming a junction with wire 60 which connects with the minus line by way of wire 48. Hence any hall push button which dispatches the car upwardly, controls the car to the exclusion of all the remaining hall buttons which latter are rendered inoperative by operation of the non-interference device 11 to open its contactors and thus open the common feed wire 44 for the hall buttons. However, for movement of the car upwardly the car buttons remain effective to cause the car to respond thereto, the car traveling to a farthest-up landing for which a car button is actuated, before reversal is normally effective. For movement of the car downwardly, any hall buttons below car position are effective to intercept the car, but hall buttons for landings above car position are inoperative until the car has reached the farthest-down landing for which a car or hall push-button is actuated and then the first hall button to be operated after the car reaches such landing, takes possession of the car to the exclusion of all remaining hall buttons and at the same time all car buttons remain effective.

For car switch operation, the knife switch I is thrown over to engage lower contactors 108 and the knife switch J is thrown over to engage contactors 89. By throwing over the switch I, the car start or dispatch function of the car and hall buttons is rendered inoperative by disconnecting the feed wires 23 and 25 from the "up" and "down" direction switch windings 3 and 4, and the control of the circuits for such windings is transferred to the car switch. Hence the car switch through its control of the direction switches is effective to open and close the circuits for the windings of the reversing switches and in such manner effect start, stop and reversal of the car at will at any point intermediate the limits of car movement. Movement of the car switch segment H to engage contactors 91 and 92 completes an energizing circuit for the winding 1 of the "up" direction switch, by way of the plus wire 93, car switch contactors 91, 92 by way of the car switch segment, wire 103, switch I, wire 23, through winding 1 to wire 47, and to the minus main by wire 48.

Movement of the car switch segment to engage contactors 91 and 90, completes an energizing circuit for the winding 2 of the "down" direction switch by way of the plus wire 93, car switch contactors 91, 90 and 94, wire 95, switch I, wire 25, through winding, wire 47, and to the minus main by way of wire 48. The knife switch J by being thrown over, connects the "up" common wire 23 with the minus line by way of a wire 96 including the "up" indicating light 12 in the car, and connects the "down" common wire 25 with the minus line by way of a wire 97 including the "down" indicating light 13 in the car. The car and hall push-buttons remain operable to intercept the car when it is under car switch control, such interception being effective, independently of the direction switches, through the intermediary of the intercepting system of circuits and associated apparatus. Hence the car operator needs only to move the car switch to either desired running position and leave it in such positon until reversal is desired and in such manner initiate start of the car in the desired direction. With the car switch remaining in such position, the car will be intercepted at any landings toward which it is moving for which car and hall buttons are actuated, and car starts from each landing at which the car is intercepted is effected by closing the hoistway door and car gate, such starts being in a direction as determined by whichever direction switch is closed as by the setting of the car switch, the latter of course being operable at will and through control of the direction switches, to start, stop and reverse at any point intermediate the limits of car movement. Furthermore since the "up" indicating light 12 is in the common feed wire circuit 23, said light will be caused to go "on" regardless of direction of car travel, by actuation of any buttons for landings above car position and will remain "on" until the car is brought to the farthest-up landing for which a push-button is actuated, and indication that the farthest-up landing for which a push-button is actuated is reached, is given by the light being extinguished as caused by the feed for said light being open-circuited at the floor-selector switch corresponding to such landing. The "down" indicating light is in the common feed wire circuit 25 and will be caused to go "on" regardless of direction of car travel, by actuation of any buttons for landings below car position and will remain "on" until the car is brought to the farthest-down landing for which a push-button is actuated and indication that the farthest-down landing for which a push-button is actuated, is reached, is given by the light being extinguished as caused by the feed for said light being open-circuited at the floor-selector switch corresponding to such landing.

Thus far it will be observed, that for car switch operation, the car and hall buttons remain effective to cause interception of the car and to control the "up" and "down" indicating lights in the car, but they are ineffective to dispatch the car or in other words start its movement toward any landing, such control of the car being effected by the car switch independently of the push-button controlled apparatus. By rendering the dispatch operation of the buttons inoperative, a greater range of control is given to the car operator who by operation of the car switch can reverse the car at any point at will, while on the other hand, if the car switch is not used and with the buttons in the car and in the hall retaining their "dispatch function" as well as their intercepting function, the operator of course can in such case dispatch the car to any desired landings by means of the car buttons, and the car will travel to the farthest landings for which either car or hall-buttons are actuated before reversal is effective and so, reversal at will at any desired point cannot readily be effected without the use of additional means whose mode of operation is not as convenient in use as is the car switch arrangement.

A knife switch W is effective by being actuated selectively to engage contactors 101 or contactors 102 to condition the system to render the intercepting function of the car and hall buttons inoperative, so that stop of the car is then under control of the car switch exclusively during transit in one direction as dependent on the setting of the knife switch, but said push-buttons at the same time remain operable to register the calls and control the car lights. By closing the knife switch in either direction, a relay 98 is energizable by closure of contactors 99, or 99' of the "up" and "down" direction switches respectively, to open its contactors 100, the latter being in the energizing circuit 61' of the winding 40 of the time switch E. Hence by opening the circuit of the winding 40 the intercepting system of circuits are rendered inoperable by being open-circuited at the contactors 39 and 39' so that the stop of the car is effected exclusively by the car switch as by moving it to "off" position to effect opening of a direction switch which will in effect de-energize a reversing switch winding and also condition the door lock cam to unlock the hoistway door, and also condition the gate switch release mechanism so that when the car gate is opened, it will be held in such position by said gate latch mechanism, the latter not illustrated herein but being illustrated and described fully in a co-pending application by applicant hereinafter referred to.

Summing up for car switch operation, the car switch is effective to cause start, stop and reversal of the car at will at any point between the limits of the car movement and at the same time the car and hall push-buttons cannot dispatch the car but remain effective to intercept it and also give indication to the car operator through intermediary of the "up" and the "down" signals in the car as to when the car has reached the farthest-up and farthest-down points for which push-buttons are actuated, and both the intercepting and car start or dispatch functions of the car and hall buttons can be rendered inoperative without interfering with their function to register calls and control the "up" and "down" car signals, in which case, the start, stop and reversal of the car is under exclusive control of the car switch which in effect provides for express operation of the car at the discretion of the operator.

A device O consisting of a worm 103 adapted for rotation by connecting it with the car or some part of the hoisting apparatus in a well known manner (not shown), causes movement of a contactor 104 carried by a traveller 105, to co-operate with fixed contactors 104' one for each landing, each of said fixed contactors being connected to one of the wires 109 which form parts of an energizing circuit for its associated floor-relay winding which circuit by-passes the floor-selector contactors 20, 21, and 22. The remaining portion of the by-pass circuit consists of the traveling contactor 105, wire 106, a knife switch 107, and top contactors 108 closed when the respective reversing switches are closed.

The contactor 104 travels in unison with the car, so that it engages a contactor 104' corresponding to whichever selector switch is being opened as for example to open-circuit contactors 20 and 22 or contactors 20 and 21 in the circuit of its associated floor-relay winding. In this manner, a by-pass is provided around each floor-selector as it is actuated so that on the one hand, any floor-relay can be energized or set in response to its button throughout the period during which its floor-selector is open-circuited, provided the car operator does not stop the car at its landing, and on the other hand, any floor-relays which have been set before the car reaches their stopping zone will remain undisturbed if the car operator does not desire to stop at their landings, and this is so because when the car is moving, either reversing switch is closed so that the by-pass circuit is completed by whichever contactors 108 are closed and when said contactors are opened as when car stop is effected by the car operator at any landing, the floor-relay corresponding to the landing stopped at will be deenergized because its circuit will be opened at its floor-selector and also at the top contactors 108 in the by-pass wire.

It will be understood that the by-pass circuit controlled by the device O is to be rendered inoperative by opening the knife switch 107 while the system is under control of the push-buttons alone, and is to be rendered operable by closing the knife switch 107 during car switch control and then only when the operator desires to operate the car as express in which case the knife switch W should also be closed in one direction or the other depending on the direction in which express service is desired so that the operator controls the car exclusively by means of the car switch and at the same time the push-buttons are actuable at any time regardless of the position of the car and the direction of car movement to register calls and control the signals, but are ineffective to control the car in any way for the one direction of movement, and any floor relays which have been set prior to the car reaching their landings will remain undisturbed in such set position if the car operator does not stop the car at their landings as for example when the car is traveling in express direction.

A push-button 110 is provided so that the car operator can restore the feed 78 for a reversing switch winding without having to first open the car gate. By restoring such feed the system is conditioned so that the car operator by manipulating the car switch and at the same time keeping said button pressed, can and without delay, inch the car to level it with the landing if it should over-run or under-run the landing when stopping thereat. The push-button 110 normally close-circuits contactors 111 and is included in the circuit 72 at a point intermediate the two windings 73 and 74. When it is desired to effect the inching operation, the button is actuated to open-circuit contactors 111 and close-circuit contactors 112, so that the winding 74 is energized and at the same time the winding 73 is de-energized.

The effect of actuating said button is to close the feed 78 for the reversing switch winding at the contactors 31, and the contactors 64 will also be closed at this time and the circuit for said winding will be completed by closure of contactors 5 or 6 dependent on whichever direction switch is closed as controlled by the setting of the car switch. Contactors 31' and 76 are also closed and provide a feed for the windings 9 and 10, the effect being to prevent opening of a hoistway door and its contactors during such inching operation. The car gate as well as the hoistway doors must be closed during such operation because the wire 78 is dominated by the car gate contactors 7 and also the contactors 10ª. The door-contactors 8 being in series with the winding 10 in effect prevents energization of the latter to close contactors 10ª unless all hoistway doors are closed and locked.

According to another arrangement a by-pass circuit 116 around the contactors 39 and 39' controllable by a relay 113 responsive to a push-button 114, can without delay be immediately closed to cause reverse movement of the car to return it to and automatically stop it at the landing. Hence, if when in stopping, the car should over-run the landing sufficiently to close the floor-selector corresponding to the landing stopped at thus to close the series circuit 34 by way of all the floor-selector switches, the operator by actuation of said button 114 will in effect complete the intercepting circuit wires 32, and 34 by way of the series connected selector contacts 33 and 17 to wire 38 and by-pass wires 116 to energize a reversing switch winding to cause reverse movement of the car as controlled by operation of a direction switch through setting of the car switch, and the car for such return movement will be automatically stopped substantially level with the landing by the actuation of the floor-selector switch to open-circuit the series intercepting circuit 34 at such point. When such reverse operation of the car is to be initiated, the car button corresponding to the landing stopped at may first be actuated to open-circuit the shunt for said landing, the car switch then set to give direction and then momentary actuation of the button 114 initiates movement of the car in a reverse direction by completing the by-pass 112 at the relay contactors 113', and the relay 113 is maintained closed by a self-holding circuit 115 including the contactors 61 of a reversing switch so that when automatic stop is effected by opening of the latter switch, said self-holding circuit is opened to permit opening of the by-pass circuit 112 at the relay contactors 113'.

Of course it will be obvious that either one of the two arrangements described for effecting return of the car to the landing in case of over-run, can be used to the exclusion of the other, the latter described arrangement appearing as the more desirable because the stop is fully automatic and the car platform will be brought to a stop substantially level with the landing due to the stop being controlled by the floor-selector switch.

Reference will now be made to a co-pending application by applicant, Serial Number 236,740, filed November 30, 1927 in which case normally closed relay contactors in the circuit of each floor-relay switch enables its button by actuation only once to register the call regardless of the direction of movement of the car and the position of the car at the time the button is actuated, and car controlled apparatus is employed to control said relay contactors to re-set each floor relay switch. However, in the present application, a standard type floor-selector switch is included in the circuit of each floor-relay switch and the arrangement as a whole enables any button, excepting one if it may be actuated just as its floor-selector switch is open-circuited as when the car is at its landing, by only the single actuation thereof to register the calls regardless of the direction of movement of the car and the position of the car at the time the buttons are actuated, and said floor-selector switch for each landing, functions as when the car is at its landing, to re-set its associated floor-relay switch.

Hence while the present invention does not provide the most desirable arrangement as to the matter of registering calls, it does however provide a much more simple and inexpensive arrangement than does the arrangement in the co-pending application, and its lack simply entails a second push of a button which may have been actuated just as the car was passing its landing.

In another co-pending application of the applicant, Serial Number 127,522, filed August 6, 1926, a standard type floor-selector switch is included in the circuit of each floor-relay switch as in the present case, but the arrangement as a whole does not enable the buttons for those landings which the car is moving away from, to be effective at such time to register calls, which can be done with the present arrangement by only single actuation of the buttons.

What I claim is:

1. A control system for an elevator car comprising control means for each of a plurality of landings any actuable at any time excepting when the car is within the stopping zone of its associated landing.

2. A control system for an elevator car comprising control means for each of a plurality of landings any control means actuated while the car is moving toward or away from its landing, effective to register the call, and any control means actuated while the car is within the stopping zone of its associated landing ineffective to register the call.

3. A control system for an elevator car comprising a floor-relay switch for each of a plurality of landings, each switch having a winding, any of said windings being energizable at any time excepting when the car is within the stopping zone of its associated landing.

4. A control system for an elevator car comprising a floor-relay switch for each of a plurality of landings each having a winding and a self-holding circuit therefore, any winding being energizable at any time, excepting if the car is within the stopping zone of its landing.

5. A control system for an elevator car comprising "up" and "down" direction switches each having an operating winding, "up" and "down" feed wires connecting with said "up" and "down" operating-windings respectively, one of said feed wires being energized and including its winding while at the same time the other feed wire is energized exclusively of its winding.

6. A control system for an elevator car comprising "up" and "down" direction switches each having an operating winding, "up" and "down" feed wires connecting with said "up" and "down" operating-windings respectively, one of said feed wires being energized and including its winding while at the same time the other feed wire is energized exclusively of its winding, and means effective when said energized winding is de-energized, to include said other feed wire in circuit with its winding without interrupting energization of the latter feed wire.

7. A control system for an elevator car comprising "up" and "down" direction switches each having an operating winding, "up" and "down" feed wires connecting with said "up" and "down" operating-windings respectively, one of said feed wires being energized and including its winding while at the same time the other feed wire is energized exclusively of its winding, and means effective when said energized winding is de-energized, to include said other feed wire in circuit with its winding without interrupting energization of the latter feed wire, and means operable at will to form an open circuit in said other feed wire without affecting the latter when conditioned to include its winding.

8. A control system for an elevator car comprising a floor-relay switch for each of a plurality of landings each having a winding and a self-holding circuit, "up" and "down" direction switches each having an operating-winding, floor-selector switch mechanism for each landing actuable in accordance with the position of the car, "up" and "down" common feed wires for said "up" and "down" direction switch windings controlled by said floor-selector mechanism, said self-holding circuit for each floor-relay switch connecting with said common feed wires by way of its associated floor-selector, means to render said "down" feed wire energizable while at the same time the "down" direction switch winding is ineffective to close its switch, and means to render the "up" common feed wire energizable while at the same time "up" direction switch winding is ineffective to close its switch.

9. A control system for an elevator car comprising a floor-relay switch for each of a plurality of landings each having a winding and a self-holding circuit, "up" and "down" direction switches each having an operating-winding, floor-selector switch mechanism for each landing actuable in accordance with the position of the car, "up" and "down" common feed wires for said "up" and "down" direction switch windings controlled by said floor-selector mechanism, said self-holding circuit for each floor-relay switch connecting with said common feed wires by way of its associated floor-selector, means operable when the "up" feed wire is energizing said "up" direction switch winding to render said "down" feed wire energizable, while at the same time the "down" direction switch winding is ineffective to close its switch, and means operable when the "down" feed wire is energizing said "down" direction switch winding to render said "up" feed wire energizable, while at the same time the "up" direction switch winding is ineffective to close its switch.

10. A control system for an elevator car comprising a floor-relay switch for each of a plurality of landings each having a winding and a self-holding circuit, "up" and "down" direction switches each having an operating-winding, floor-selector switch mechanism for each landing actuable in accordance with the position of the car, "up" and "down" common feed wires for said "up" and "down" direction switch windings controlled by said floor-selector mechanism, said self-holding circuit for each floor-relay switch connecting with said common feed wires by way of its associated floor-selector, both of said feed wires being energizable regardless of the direction of movement of the car, said "up" feed wire being energizable independently of the "up" direction switch winding when movement of the car is downwardly, and said "down" feed wire being energizable independently of the "down" direction switch winding when movement of the car is upwardly.

11. A control system for an elevator car comprising "up" and "down" direction switches each having an operating winding, push-button controlled floor-relay switches, floor-selector switch mechanism actuable in accordance with the position of the car, "up" and "down" common feed wires connecting with said "up" and "down" direction switch windings respectively, receiving their feed by way of said floor-relay switches and said floor-selector mechanism, means controllable by the "up" direction switch to render said "down" feed wire energizable independently of the "down" direction switch winding said means operable when said "up" direction switch opens, to include said "down" direction switch winding in said "down" feed wire circuit without interrupting energization of said wire, and means controllable by the "down" direction switch to render said "up" feed wire energizable independently of said "up" direction switch winding, said means operable when said "down" direction switch opens, to include said "up" direction switch winding in said "up" feed wire circuit without interrupting energization of said latter wire.

12. A control system for an elevator car comprising signalling means, and manually operable control means for each of a plurality of landings effective to control the car and to control said signalling means, said signalling means responding immediately to actuation of any of said control means regardless of the position of the car when said control means are actuated.

13. A control system for an elevator car comprising "up" and "down" signalling means, and manually operable control means for each of a plurality of landings effective to control the car and to control said "up" and "down" signalling means to give indication only when the car has reached the farthest-up and farthest-down points respectively for which control means are actuated.

14. A control system for an elevator car comprising a signal, a control means at each of a plurality of landings effective to control the car and to control said signal, said signal responding immediately to actuation of any of said control means regardless of the position of the car when said control means are actuated and a car switch system of circuits to control the car at the same time said control means are effective.

15. A dual control system for an elevator car comprising a push-button controlled system of circuits having combined dispatch and intercepting functions, car switch controlled circuits, signalling means, and means to condition said push-button system of circuits so that while the car switch is effective to control the car, said push-button system is effective to intercept the car and control said signalling means, but is ineffective to dispatch the car.

16. A dual control system for an elevator car comprising a push-button system of circuits having combined dispatch and intercepting functions, car switch controlled circuits, signalling means normally inoperative while the car is under control of the push-button system alone, and means to render the car switch effective to control the car and condition said push-button system of circuits to be effective to intercept the car and control said signals but ineffective to dispatch the car while it is under control of said car switch.

17. A control system for an elevator car comprising a car switch system of circuits to control the car, signalling means on the car, and manually operable control means for each of a plurality of landings effective to intercept the car and to control said signalling means to give indication when the car has reached the farthest-up and farthest-down landings for which control means are actuated.

18. A control system for an elevator car comprising a car switch system of circuits to control the car, one "up" and one "down" signal light on the car, and manually controlled means for each of a plurality of landings effective to intercept the car and to control said "up" and "down" signal lights to give indication when the car has reached the farthest "up" and farthest "down" landings for which control means are actuated.

19. A control system for an elevator car comprising manually operable control means at each of a plurality of landings, signalling means, car actuated switch mechanism for each of a plurality of landings, car control circuits controlled by said control means and said switch mechanism, and said signalling means being controlled by said car control circuits and switch mechanism.

20. A control system for an elevator car comprising one "up" and one "down" signal device, and a push-button controlled circuit for each of a plurality of landings effective to control the car, and arranged so that any actuated push-button below car position is effective immediately to actuate said "down" signal, and any actuated push-button above car position is effective immediately to actuate said "up" signal.

21. A control system for an elevator car comprising signalling means, push-button controlled means at each of a plurality of landings effective to intercept the car and at the same time control said signalling means, and means to render said push-button controlled means ineffective to intercept the car without disturbing their effectiveness to control said signalling means.

22. A control system for an elevator car comprising car switch controlled circuits, signalling means, push-button controlled means for each of a plurality of landings effective to intercept the car and at the same time control said signalling means while the car is under control of said car switch circuits, and means to render said push-button controlled means ineffective to intercept the car while at the same time they remain effective to control said signalling means.

23. A control system for an elevator car comprising control means for each of a plurality of landings, any control means actuated while the car is moving toward or away from its landing but not while the car is within the stopping zone of its landing effective to register the call and means to render any control means ineffective to register the call, if actuated when the car is restarting from its landing.

24. A control system for an elevator car comprising control means at each of a plurality of landings all effective for both directions of car movement to intercept the car, and means to render said control means effective to intercept the car only for one direction of movement and render them operable one at a time to the exclusion of all the others, to control the car for the other direction of car movement.

25. A control system for an elevator car comprising control means at each of a plurality of landings effective for one direction of car movement to intercept the car at their landings, the first control means to be actuated to reverse movement of the car subsequently to completion of the trip in said one direction, controlling the car to bring it to its landing to the exclusion of all the remaining control means, and means operable at will to render all control means effective to intercept the car for either direction of travel.

26. A control system for an elevator car comprising control means at each of a plurality of landings all operable for one direction of car movement to intercept the car at their landings, and means automatically to render all control means inoperative when movement of the car in a reverse direction is initiated by one of said control means, said control means becoming operable when the car completes its trip to the landing corresponding to the initiating control means.

27. A control system for an elevator car comprising control means at each of a plurality of landings, additional control means on the car for each of said landings, said control means at the landings effective only for one direction of car movement to intercept the car at their landings, the first of said control means at the landings, actuated subsequently to completion of the trip in said one direction, to cause car movement in the other or reverse direction, controlling the car to bring it to its landing without interception of the car at intermediate landings while at the same time all of said control means on the car remain effective to intercept the car.

28. In combination, an elevator car, a car gate having contactors controllable thereby, and means automatically to re-start the car at the expiration of a pre-determined time period after each stop independently of whether said car gate contactors are opened during a stopping period and effective if the car gate contactors are opened during a stopping period to re-start the car regardless of whether said time period has expired immediately by closure of said car gate contactors.

29. In combination, an elevator car, a car gate having contactors controllable thereby, a timing switch having a retarded closing movement, operable to close independently of opening said car gate contactors during a stopping period, to effect automatic re-start of the car, and additional means comprising a timing switch having a retarded opening movement, and being closable only if said car gate contactors are opened during a stopping period, and effective by the closure of said car gate contactors automatically to re-start the car independently of the first named timing switch.

30. In combination, the car, a car gate having contactors controllable thereby, a reversing switch having a winding, parallel circuits to control said winding, a timing switch in each of said parallel circuits, one timing switch effective independently of whether said car gate contactors are opened during a stopping period effective automatically to energize said reversing switch winding to re-start the car, and the other of said timing switches controllable to be closed by opening said car gate during a stopping period and rendered effective by closing car gate contactors, automatically to energize said reversing switch winding to re-start the car.

31. A control system for an elevator car comprising an initial control circuit to start the car independently of manual operation, a push-button controlled intercepting system of circuits, and means effective after each start of the car automatically to transfer control of the car from said initial control circuit to said intercepting system of circuits.

32. A control system for an elevator car comprising a switch having an operating-winding, an initial energizing circuit for said winding, a timed relay switch to control said circuit automatically to start the car, a push-button system of circuits for said winding effective automatically to intercept the car at landings, and means to transfer control of said switch winding from said initial energizing circuit to said intercepting system of circuits.

33. A control system for an elevator car comprising a switch having an operating winding, parallel circuits each operating independently to control an initial energizing circuit for said winding, a timed relay switch in each of said circuits, a push-button system of circuits for said winding effective automatically to intercept the car at landings, and means to transfer control of said switch winding from both of said parallel circuits to said intercepting system of circuits.

34. An intercepting control circuit for an elevator car comprising car actuated contactors for each of a plurality of landings connected in series, a normally closed shunt around said contactors for each of said landings, and manual control means at each of said landings, any control means for landings toward which the car is moving effective to open its shunt but ineffective to open same if the car is within the stopping zone for its landing.

35. An intercepting control circuit for an elevator car comprising car actuated contactors for each of a plurality of landings, connected in series, a normally closed shunt around said contactors for each of said landings, manually controlled contactors at each of said landings, any of said contactors effective to open its associated shunt at any time excepting if the car is within the stopping zone corresponding to its landing, so that with the car stopped within the stopping zone for any landing, said series circuit is closed by way of all of said car actuated contactors in series excepting those corresponding to the landing whose stopping zone the car is in, and includes the shunt and its contactors for the landing whose stopping zone the car is in.

36. An intercepting control circuit for an elevator car comprising car actuated contactors for each of a plurality of landings, connected in series, a shunt around said contactors for each of said landings, a winding controllable by said series and shunt circuits, and a circuit for said winding effective to start the car independently of said series and shunt circuits.

37. An intercepting control circuit for an elevator car comprising car actuated contactors for each of a plurality of landings, connected in series, a manually controllable shunt circuit around said contactors for each of said landings, a winding controllable by said series and shunt circuits, a circuit for said winding independent of said series and shunt circuits, and a time switch in said independent circuit effective automatically to re-start the car.

38. An intercepting control system for an elevator car comprising car actuated contactors for each of a plurality of landings, connected in series, a manually controlled shunt around said contactors for each of said landings, a switch having an operating-winding controllable by said series and shunt circuits, a circuit for said winding independent of said series and shunt circuits, a time switch in said independent circuit effective automatically to close it to automatically re-start the car, and means automatically to transfer the control of said winding from said independent circuit to said series and shunt circuits.

39. In combination, an elevator car, a car gate having contactors controllable thereby, a switch having a winding, a circuit for said winding comprising contactors for each of a plurality of landings, connected in series and controllable in accordance with the position of the car, a manually controlled shunt circuit around each of said contactors, and parallel circuits for said winding initially to energize it independently of said series and shunt circuits, one of said parallel circuits including a timed relay switch effective to re-start the car independently of whether said car gate is opened during stop of the car, and the other of said parallel circuits including a timed relay controllable to be closed only if the car gate is opened during car stop and effective by closing said car gate contactors to re-start the car independently of the first named parallel circuit.

40. An intercepting control circuit for an elevator car comprising car actuated contactors for each of a plurality of landings, connected in series, a manually controllable shunt circuit around said contactors for each landing, a reversing switch having an operating winding, a car gate having contactors controllable thereby, parallel circuits to control said winding each including a timed relay switch, one of said relay switches effective automatically to re-start the car by closure of said car gate contactors, and means automatically to transfer control of said reversing switch winding from both of said parallel circuits to said series and shunt system of intercepting circuits.

41. A control system for an elevator car, comprising one "up" and one "down" signal on the car, a single push-button at each of a plurality of landings and circuits controlled thereby, effective so that any buttons for landings above car position, as soon as they are actuated and regardless of the direction of car movement when actuated, cause actuation of said "up" signal, and any buttons for landings below car position, as soon as they are actuated and regardless of the direction of car movement when actuated, cause actuation of said "down" signal.

42. A control system for an elevator car comprising signalling means, push-button controlled means for each of a plurality of landings having combined dispatch and intercepting functions and also controlling said signalling means, and means to render said push-button controlled means ineffective to dispatch and intercept the car, said push-button controlled means at the same time remaining effective to control said signalling means.

43. A control system for an elevator car comprising signalling means, push-button controlled means for each of a plurality of landings having combined dispatch and intercepting functions, a car switch system of circuits, means to render said control means effective to intercept the car only for one direction of movement and render them operable individually to control the car for the other direction of movement, means to transfer the start operation of the car from said control means to said car switch system of circuits so that said control means are effective while the car is moving under control of the car switch to intercept the car and at the same time control said signals, and means to render the intercepting function of said control means inoperative while at the same time they remain effective to register calls and to control said signalling means, in which case the car is controlled exclusively by said car switch.

44. A control system for an elevator car comprising signalling means and means to control said signalling means comprising a push-button controlled floor-relay for each of a plurality of landings, each relay being energizable at any time regardless as to whether the car is moving toward or away from its landing, excepting when the car is within the stopping zone of its landing, and each relay having a self-holding circuit to maintain it in actuated position.

45. A control system for an elevator car comprising signalling means, a push-button controlled floor-relay switch for each of a plurality of landings each having a self-holding circuit to maintain it in actuated position, a floor-selector switch mechanism for each landing, each actuable by the car to be open-circuited only when the car is in a pre-determined zone related to its landing, each being in the self-holding circuit of its associated floor-relay switch, and circuits to control the car and to control said signalling means controllable by said floor-relay switches and said floor-selector switch mechanism.

46. A control system for an elevator car comprising signalling circuits and car control circuits, push-button controlled floor-relay switches and floor-selector switch mechanism to control said signalling and car control circuits, and means to render said floor-relay switches and floor-selector switch mechanism effective to control said signalling circuits and ineffective to control said car control circuits.

47. A control system for an elevator car comprising signalling means, "up" and "down" direction switches, each having an operating winding, a push-button controlled circuit for each of a plurality of landings to control "up" and "down" circuits for said direction switch windings, and means to exclude said windings from said "up" and "down" circuits and to connect the latter with said signalling means.

48. A control system for an elevator car comprising, push-button controlled contactors for each of a plurality of landings, having a winding operatively associated therewith, car controlled switch mechanism and a circuit controlled thereby for each winding whereby it is energizable at any time excepting when the car is within a pre-determined zone relative to its landing, and additional means whereby each relay winding is rendered energizable when the car is within said pre-determined zone.

49. A control system for an elevator car comprising, push-button controlled contactors for each of a plurality of landings, having a winding operatively associated therewith, car controlled switch mechanism and a circuit controlled thereby for each winding whereby it is energizable at any time excepting when the car is within a pre-determined zone relative to its landing, and additional means whereby each relay winding is rendered energizable when the car is within said pre-determined zone, but only if the car does not stop while in said zone.

50. A control system for an elevator car comprising only one "up" and one "down" signalling device on the car, control means at each of a plurality of landings to control said signals, and car controlled means effective so that any of said control means for landings above car position, cause actuation of the "up" signal at the time said control means are actuated and any control means for landings below car position, cause actuation of said "down" signal at the time said control means are actuated.

51. A control system for an elevator car comprising only one "up" and "down" signalling device on the car, control means at each of a plurality of landings to control said signals, and car controlled means effective so that any of said control means for landings above car position, cause actuation of the "up" signal at the time said control means are actuated and any control means for landings below car position, cause actuation of said "down" signal at the time said control means are actuated, said car controlled means causing said "up" and "down" signaling means to operate in a manner to give indication that the car has reached farthest "up" and farthest "down" landings respectively for which said control means are actuated, upon the arrival of the car at such landings.

52. A control system for an elevator car comprising a manually operable control means for each of a plurality of landings, a car actuated switch for each of said landings, circuits responsive to said control means to bring the car to their landings and controllable by said car actuated switches to effect automatic stop of the car at their landings, and manually controllable "up" and "down" contactors on the car, said car actuated switches each closed when the car overruns its landing in stopping and effective jointly with said "up" or "down" contactors to cause reverse movement of the car to return it to the landing over-run, each car actuated switch effective automatically to stop such return movement of the car to its landing independently of said manually operable contactors.

53. In combination, an elevator car, a car gate, hoistway doors, and means automatically to re-start the car at the expiration of a pre-determined time period after stop at a landing, independently of whether a hoistway door is opened during said stop, and effective by closure of both the door and said gate to re-start the car immediately regardless of whether said time period has expired.

54. In combination, an elevator car, a car switch, a door, a circuit-controller controlled by said door to be closed by opening said door, a switch operated to closed position by closing movement of the door, and a car running circuit controlled jointly by said car switch, door-controlled circuit-controller and door operated switch so that closure of said door subsequently to movement of said car switch to on position causes immediate start of the car.

55. In combination an elevator car, a car switch, a time opening switch, a door, switch means controlled by said door when opened to cause said time opening switch to close, a car running circuit controlled jointly by said car switch, the time opening switch, and the door controlled switch, so that if the car switch is in "on" position prior to closure of the door, the closure of the door will cause immediate start of the car, a bypass circuit around the time opening switch, said bypass including a time closing switch operating to automatically energize the car running circuit independently of said time opening switch, thus limiting the stop of the car at a landing without the door being opened.

56. In combination, an elevator car, a car switch, a door, a circuit-controller operated to circuit closing position by opening said door, an additional switch operated to closed position by closing movement of the door, and a car running circuit controlled jointly by said car switch, the door operated switch and door-controlled circuit controller in a manner so that closure of said door subsequently to movement of said car switch to on position causes immediate start of the car in a direction determined by the position of said car switch.

57. In combination an elevator car, a car switch, a door, a time opening switch controlled by said door to be closed by opening of said door, said latter switch having a delayed opening movement upon closure of the door, an additional switch operated to closed position by closing movement of the door, a car running circuit controlled jointly by said car switch, said time opening switch, and by said door operated switch so that closure of the door causes immediate start of the car, and a bypass circuit around said time opening switch for energizing the car running circuit independently of said switch, said bypass circuit being closed in response to energization of the car running circuit, and car position controlled means for breaking said bypass circuit to cause stopping of the car.

58. In combination an elevator car, a car switch, a door, a time opening switch controlled by said door to be closed by opening of said door, said latter switch having a delayed opening movement upon closure of the door, an additional switch operated to closed position by closing movement of the door, a car running circuit controlled jointly by said car switch, said time opening switch, and by said door operated switch so that closure of the door causes immediate start of the car, a bypass circuit around said time opening switch for energizing the car running circuit independently of said switch, said bypass circuit being closed in response to energization of the car running circuit, car position controlled means for breaking said bypass circuit to cause stopping of the car, and selective means operable to render said car position controlled means effective to control said car running circuit to cause automatic stop at landings in their natural order regardless of the order in which the selective means are operated.

59. In combination, an elevator car, a car switch, a door, a circuit-controller controlled to be closed by opening said door, an additional switch operated to closed position upon closure of the door, a car running circuit controlled jointly by said car switch, circuit-controller and door operated switch so that closure of the door starts the car immediately, a car controlled bypass circuit to energize the car running circuit independently of said circuit controller, and selective means to control said car running circuit to cause automatic stop at landings in their natural order regardless of the order in which said selective means are operated.

60. In combination, an elevator car, a car switch, a door, a circuit-controller controlled to be closed by opening said door, an additional switch operated to closed position by closure of the door, a car running circuit controlled jointly by said car switch, circuit-controller and door operated switch so that movement of said car switch to on position causes immediate start of the car on condition that said door is closed and movement of said car switch to off position causes stop of the car.

61. In combination, an elevator car, a car switch, a door, a switch operated to closed position by closure of the door, a circuit-controller controlled to be closed by opening said door, a car running circuit controlled jointly by said circuit-controller, car switch and door operated switch to cause start of the car in a direction determined by the position of said car switch.

62. In combination, an elevator car, a car switch, a door, a switch operated to closed position by closure of the door, a time-opening switch controlled to be closed by opening said door, said latter switch having a delayed opening movement upon closure of the door, a car running circuit controlled jointly by said car switch, time-opening switch and door operated switch when the door is closed to cause start of the car, said car switch by movement to off position being effective to cause stop of the car.

63. In combination an elevator car, a car switch, a door, a time opening switch controlled to be closed by opening said door, said latter switch having a delayed opening movement upon closure of the door, and an additional switch operated to closed position by closing movement of the door, a car running circuit controlled jointly by said car switch, time opening switch and door operated switch when the door is closed for starting the car in a direction determined by the position of said car switch, said car switch effective to stop the car, a bypass circuit around said time opening switch, time controlled means automatically to energize the starting circuit through said bypass circuit a predetermined length of time after the car has stopped at a landing and the door is not opened, and selective means to control said car running circuit to cause automatic stop of the car at landings in their natural order regardless of the order in which said selective means are operated.

64. In combination an elevator car, a car switch, a door, a switch controlled to be closed by opening said car door, an additional switch operated to closed position by closing movement of the door, a car running circuit controlled jointly by said switches when the door is closed to cause start of the car in a direction determined by the position of said car switch, stop of the car being effected by moving said car switch to "off" position, a bypass circuit around said first mentioned switch for energizing the car running circuit independently thereof, means operable in response to energization of the car running circuit to energize said bypass circuit to establish the main car running circuit, and car position control means to automatically open said last mentioned circuit to cause stop of the car.

65. In combination an elevator car, a car switch, a door, a time opening switch controlled to be closed by opening said door, said latter switch having a delayed opening movement upon closure of the door, an additional switch operated to closed position by closing movement of the door, a car running circuit controlled jointly by said car switch, said time switch, and the door operated switch when the door is closed to cause start of the car in a direction determined by the position of said car switch, stop of the car being effected at will by moving said car switch to "off" position, and a bypass circuit around said time opening switch including car position control means to open said bypass to automatically stop the car, and means operable in response to the initial energization of the car running circuit to energize said bypass circuit to include said car position control means in the car running circuit.

66. In combination, an elevator car, a car switch, a door, a time-opening switch controlled by said door to be closed by opening same and to be opened with delayed movement when said door is closed, an additional switch operated to closed position by closing movement of the door, a car control circuit controlled jointly by said car switch, time-opening switch and door operated switch when the door is closed to cause start of the car in a direction determined by the position of said car switch, means to close a by-pass circuit around said time-switch prior to its opening, and selective means to cause automatic stops of the car at landings in their natural order regardless of the order in which said selective means are operated, said car switch effective at will to cause stop of the car, said selective means including means whereby car stops are effected without having to shift said car switch from on to off position, and start of the car being effected by closure of the car gate.

67. In combination, an elevator car, a car switch having two positions which determine direction of car movement, a door, a circuit-controller controlled to be closed by opening said door, an additional switch operated to closed position by closing movement of the door, and a car running circuit controlled jointly by said car switch, circuit controller and said door operated switch when the door is closed, said car switch and door being operable in different sequences at the option of an operator to cause start of the car, so that closure of said door subsequently to movement of said car switch to on position causes immediate start of the car, or, movement of the car switch to on position subsequently to closure of said door causes immediate start of the car.

68. In combination an elevator car, a door, a time opening switch closed by opening said door, said switch having delayed opening movement upon closure of the door, a door operated switch closed by closing movement of the door, selective means to register calls, a car running circuit controlled by said door operated switch when the door is closed and said selective means to initiate start of the car, said start being conditioned upon closed position of the door whether the car is occupied or unoccupied, and said car running circuit being controlled by said selective means to cause stop of the car at landings in their natural order regardless of the order in which said selective means are operated, said door operated switch and time opening switch being effective upon closure of the door to initially energize the car running circuit to automatically restart the car from landings stopped at until all registered calls are answered, said restart from any landing being effected immediately by closure of said door operated switch by closing movement of the door and only on condition that the door is opened with the car stopped at such landing.

69. In combination, an elevator car, a car switch, a door, a circuit-controller controlled to be closed by opening said door, an additional switch operated to closed position by closing movement of the door, a car running circuit controlled jointly by said car switch, circuit-controller and door operated switch when the door is closed to cause start of the car, a by-pass around said circuit-controller subject to control by said car switch so that after the car has stopped at a landing and the door is open, the car running circuit can only be energized by closing the door and moving the car switch to "on" position, but if the door is not opened and closed following a stop, the car running circuit may be energized through said bypass circuit so that said running circuit is under control of said car switch at all times to cause stop at will, and selective means to control said car running circuit to cause automatic stops at landings successively regardless of the order in which said selective means are operated, said selective means including means whereby such automatic stops are effected without having to move said car switch to off position.

70. In combination, an elevator car, a car switch, a door, a circuit-controller controlled to be closed by opening said door, an additional switch operated to closed position by the closing movement of said door, a car running circuit controlled jointly by said car switch, circuit-controller and door operated switch when the door is closed to cause start of the car, means automatically to close a by-pass circuit around said circuit-controller, prior to opening of said circuit controller means retarding opening of the circuit controller until after said start is effected, said by-pass being subject to control by said car switch so that said running circuit is under control of said car switch at all times to cause stop at will, and selective means to control said running circuit to cause automatic stops at landings successively regardless of the order in which said selective means are operated, said selective means including means whereby such automatic stops are effected without having to move said car switch to off position.

71. In combination, an elevator car, a car switch having off and up and down positions, a door, a time-opening switch closed by opening said door and having a delayed opening movement upon closure of the door, an additional switch operated to closed position by closing movement of the door, a car running circuit controlled jointly by said car switch, time-opening switch and door operated switch when the door is closed to cause start of the car, car controlled means operative to close a by-pass around said time opening switch prior to opening of said time-opening switch, said by-pass being subject to control by said car switch so that in effect said running circuit is under control of said car switch at all times to cause stop at will, and selective means to control said running circuit to cause automatic stops at landings successively regardless of the order in which said selective means are operated, said selective means including means whereby such automatic stops are effected without having to move said car switch to off position.

ERNEST L. GALE.